United States Patent [19]
Weaver et al.

[11] 3,760,770
[45] Sept. 25, 1973

[54] BATTERY POWERED FEED CART
[75] Inventors: Frank N. Weaver; Keith B. Anderson, both of East Earl, Pa.
[73] Assignee: Weaverline Corporation, Churchtown, Pa.
[22] Filed: May 31, 1972
[21] Appl. No.: 258,456

[52] U.S. Cl............... 119/52 B, 74/473 R, 180/65, 180/68.5
[51] Int. Cl............................................. A01k 5/00
[58] Field of Search ....................... 119/51 R, 52 B; 180/65 R, 68.5, 70; 74/473 R, 475, 476, 477

[56] References Cited
UNITED STATES PATENTS
| | | | |
|---|---|---|---|
| 1,209,962 | 12/1916 | Heath | 180/65 R X |
| 1,678,033 | 7/1928 | Brumbaugh | 180/68.5 |
| 2,221,266 | 11/1940 | Roach | 119/52 B X |
| 2,941,505 | 6/1960 | Middlen | 119/52 B X |
| 3,003,573 | 10/1961 | Lorenz | 180/68.5 |
| 3,428,027 | 2/1969 | Haen et al. | 119/52 B |
| 3,625,184 | 12/1971 | Patz | 119/52 B |

Primary Examiner—Louis G. Mancene
Assistant Examiner—J. A. Oliff
Attorney—Larry L. Coats

[57] ABSTRACT

The present invention relates to a battery powered feed cart having a relatively long, high and narrow body profile and including a feed box or hopper provided with a series of augers for distributing feed from the cart into a livestock feeding area. The battery powered feed cart is provided with a low, centrally disposed, slideable battery drawer which may be selectively extended outwardly from either side of the feed cart for easy and convenient access and serviceability. Also, the present feed cart is provided with a two speed, forward-reverse transmission and a unique control linkage for actuating said transmission in an efficient and orderly manner and generally providing a control medium that prevents premature and inadvertent "on the go" shifting between forward and reverse.

10 Claims, 14 Drawing Figures

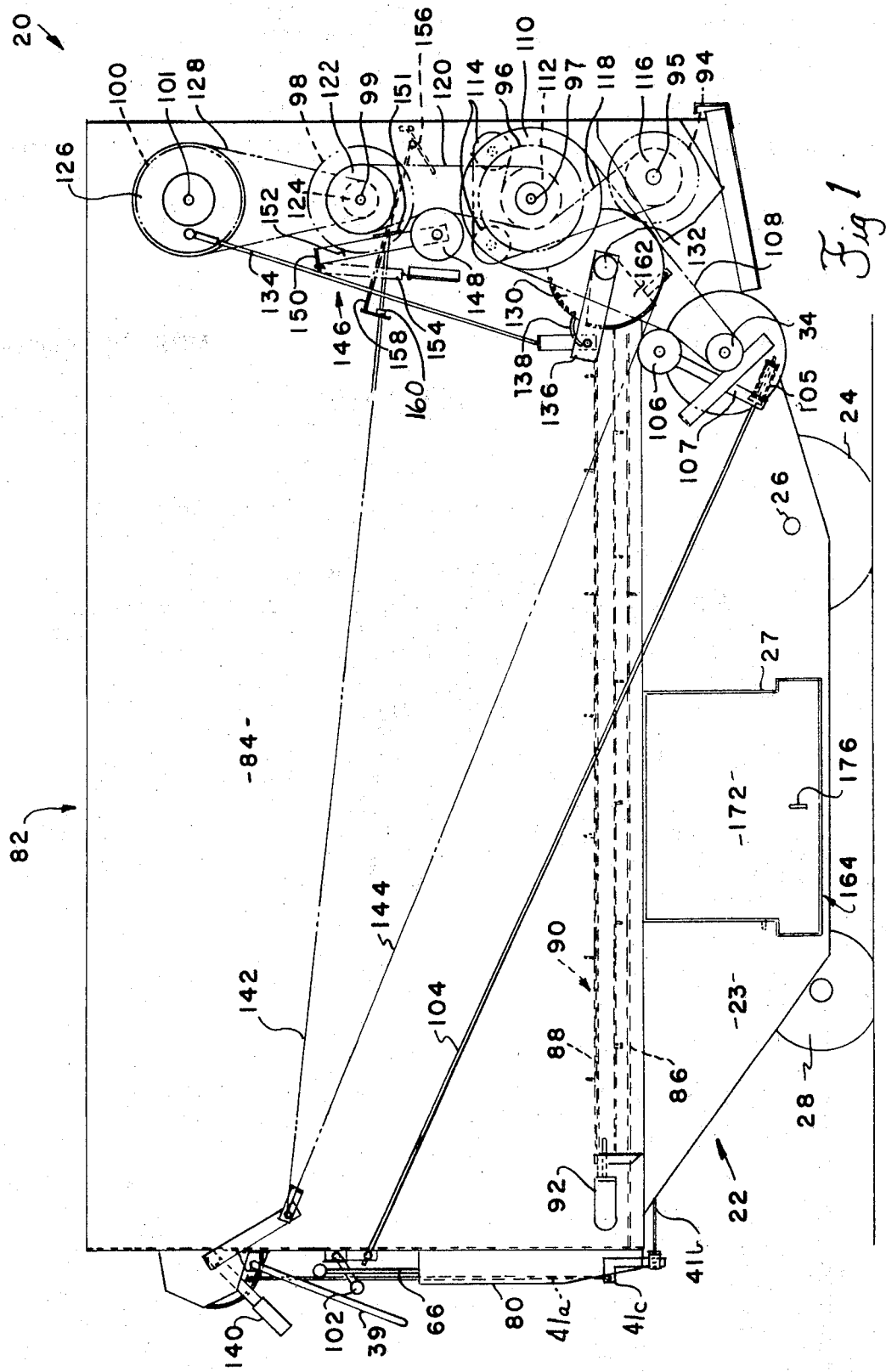

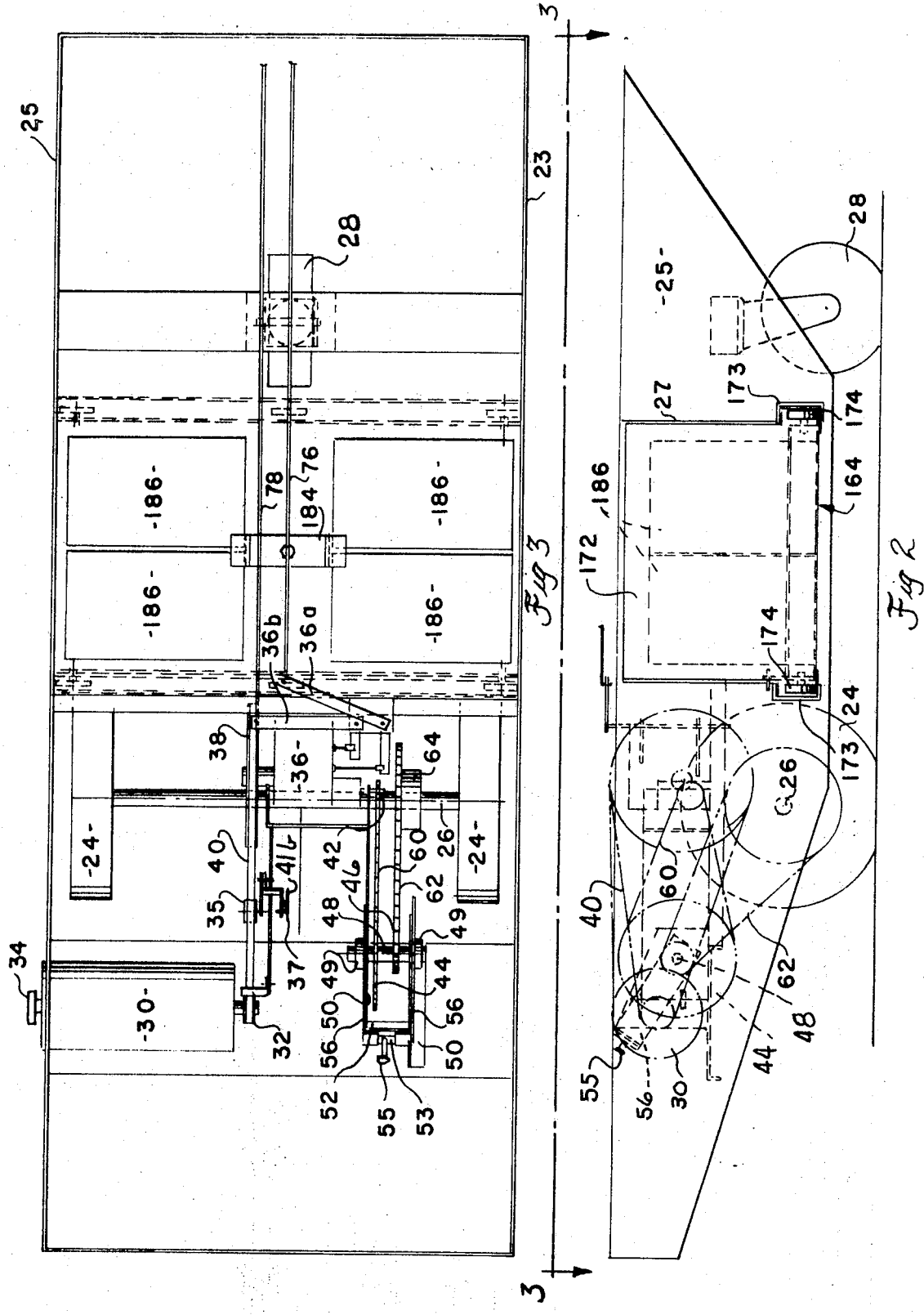

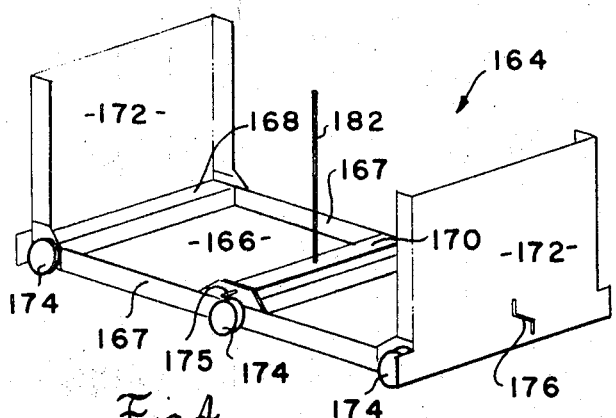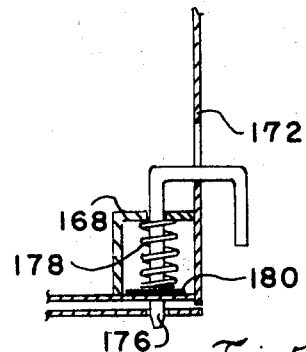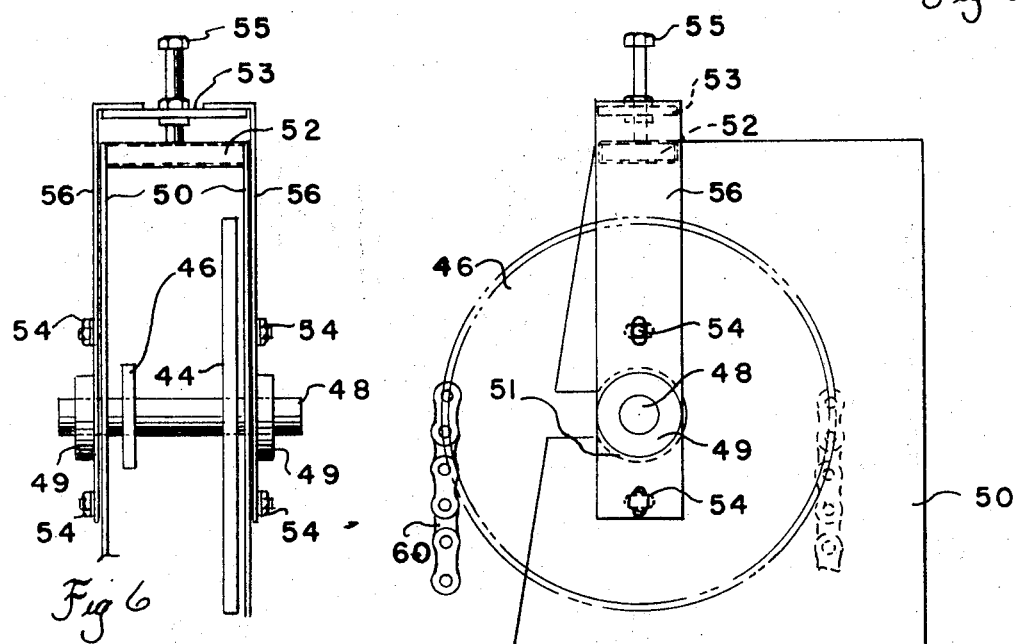
Fig 4 Fig 5 Fig 6 Fig 7 Fig 8

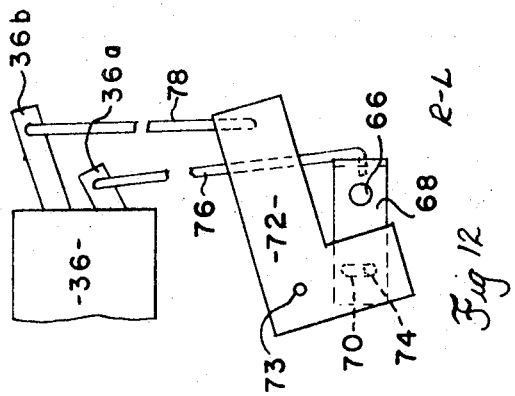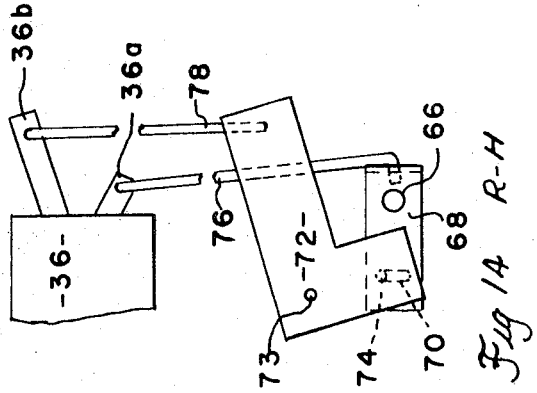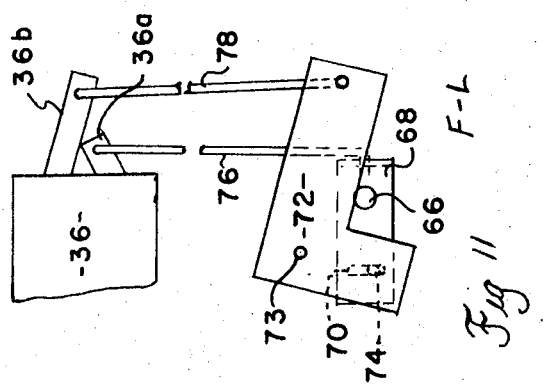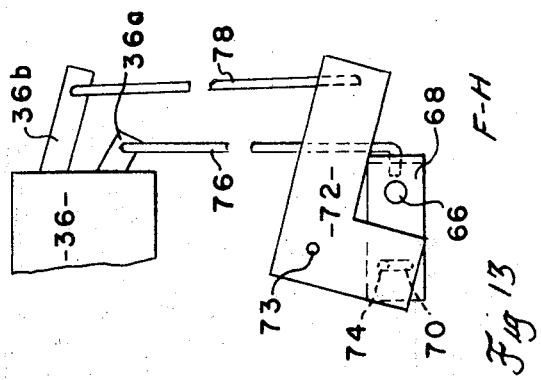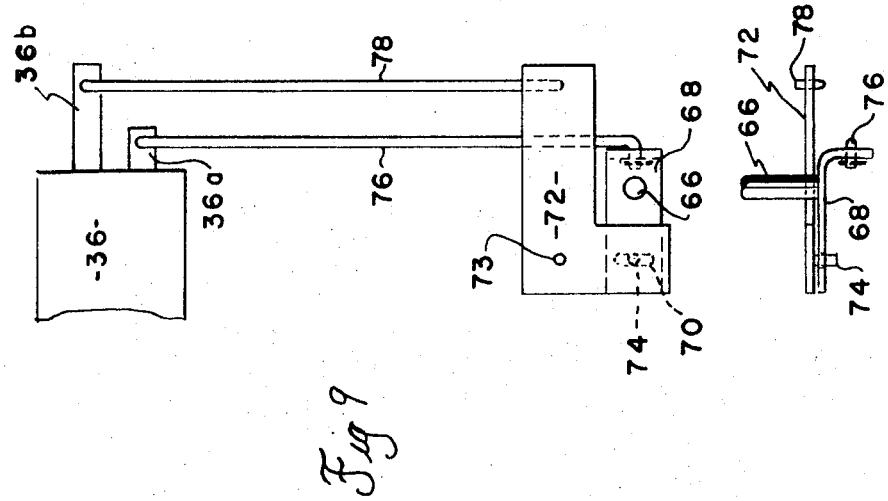

BATTERY POWERED FEED CART

BACKGROUND OF THE INVENTION

The present invention relates to livestock feeding vehicles and more particularly to a type having a long, narrow and high body profile and utilized to transport feed from a storage area, such as a silo, to a feeding area and particularly adapted to distribute feed therefrom into the livestock feeding area.

Electric powered vehicles are becoming increasingly popular, especially in utility applications where the vehicle is repeatedly used in the same limited locality. In designing electric powered vehicles, it has long been recognized that in order to furnish sufficient energy over a reasonable period of time that sufficient storage space must be provided within the vehicle to accomodate storage batteries. Because storage batteries are naturally bulky and massive, the space required is most often rather substantial, especially where the vehicle requires power to perform working functions not directly related to the motive power requirements of the vehicle such as is common with many types of agricultural machines.

Thus, the massive and spacious nature of storage batteries have presented problems for designers of electric vehicles, particularly problems relative to (1) the placement of the batteries within the vehicle, and (2 the manner of gaining access to the batteries for service and repair. In many instances the weight of the batteries alone account for over 25 per cent of the vehicle's total weight, and therefore, if the vehicle is to have substantial maneuverability, it becomes necessary to dispose the batteries in a low central portion of the total vehicle to prevent tipping during operation. Also, it is important to be able to gain quick and convenient access to the batteries for repairs and service without having to move the batteries completely from their normal storage location.

Furthermore, in some electric vehicles the transmission control is such that the operator may inadvertently shift between "forward" and "reverse" without stopping or slowing the vehicle. Such a situation is undesirable inasmuch as "on the go" shifting may result in serious damage to the transmission besides presenting a safety hazard to the operator and others in the same vicinity.

SUMMARY OF THE INVENTION

In view of the above discussed problems presented in electric vehicle design, Applicants have devised a battery powered feed cart that has exceptionally good maneuverability characteristics while providing quick, easy and convenient access to the batteries housed within the cart. Specifically, the cart is provided with a long, narrow and high body profile, the narrow body enabling the cart to pass through narrow passageways while the length and height give the cart the necessary capacity needed in the livestock feeding operation. Contributing to the maneuverability of the battery cart of the present invention is a slidable battery drawer transversely disposed about a lower center portion of the cart's undercarriage; thus, in view of the substantial weight attributed to the batteries, giving the total cart body structure a favorable center of gravity. Moreover, the battery drawer is particularly adapted to move outwardly from either side of the cart such that the batteries carried thereby may be serviced from either side of the cart and wherein the total movement of the batteries from the center of the cart's body is minimized.

Moreover, Applicants have devised a novel control linkage for shifting a two speed, forward-reverse transmission. In particular, the control linkage includes a control lever confined within an H-shaped shifting quadrant with a linkage structure interconnecting said transmission with said control lever such that lateral side to side movement shifts between "forward" and "reverse" and fore-and-aft movement shifts between "high" and "low" speeds.

It is therefore the principal object of the present invention to provide a highly maneuverable electric powered feed cart with an optimum body design that is suitable for operation in "close quarters", and is particularly provided with a low centrally oriented center of gravity that enables the feed cart to resist tipping and turn over.

Specifically, it is the object of the present invention to provide a battery powered feed cart having a relatively long, narrow, and high body profile; and wherein said body is provided with a slideable battery drawer that may be extended from either side of the cart, whereby service and repair may readily and conveniently be made.

Moreover, another object of the present invention resides in the provision of a movable battery drawer that enables one to gain access to all the batteries carried thereby without requiring the entire drawer and batteries to be removed entirely from the confines of the cart's body, thereby minimizing the "lever arm" effect realized by extending the massive batteries away from the central most portion of the body. A further object of the present invention is to provide the feed cart with a control linkage for a two speed, forward-reverse transmission that is simple, reliable and particularly adapted to prevent shifting between "forward" and "reverse" while the cart is moving at an appreciable speed.

Other objects and advantages of the present invention will become apparent and obvious from a study of the following description and accompanying drawings.

BRIEF DESCRIPTION OF THE DRAWINGS

FIG. 1 is a side elevational view of the battery powered feed cart drawn in accordance with the present invention.

FIG. 2 is a side elevational view of the feed cart's undercarriage structure, particularly illustrating the final wheel drive.

FIG. 3 is a view taken along the line 3—3 of FIG. 2.

FIG. 4 is a perspective view of a sliding battery drawer employed within the present feed cart.

FIG. 5 is a fragmentary sectional view of a spring loaded locking pin utilized to securely station the sliding battery drawer within the feed cart.

FIG. 6 is a fragmentary plan view of an adjustable shaft mounting structure for the final drive; the adjustable shaft having a pair of spaced apart chain sprockets for transmitting torque from the transmission to a wheel differential.

FIG. 7 is a fragmentary side elevational view of the adjustable shaft shown in FIG. 6.

FIG. 8 is an electrical diagram illustrating the electrical circuitry of the battery powered feed cart.

FIG. 9 is a plan view showing the basic components of the transmission control linkage.

FIG. 10 is a fragmentary side elevational view of the control linkage shown in FIG. 9.

FIGS. 11–14 are a series of views showing the transmission control linkage in various positions, each position corresponding to a distinct transmission setting.

DESCRIPTION OF PREFERRED EMBODIMENT

With reference to the drawings, particularly FIGS. 1–3, a battery powered feed cart is shown therein and indicated generally by the numeral 20. The feed cart 20 basically comprises a mobile undercarriage chassis structure 22 having a pair of laterally spaced front drive wheels 24 carried by an axle 26, and a rear wheel 28 preferably of the caster type. The undercarriage 22, which in the present embodiment is a weld assembly, further includes a pair of side walls 23, 25, each side wall having a generally rectangular opening 27 formed therein which, as will be discussed subsequently, enables a sliding battery drawer to be extended from either side of the cart 20.

Mounted within the undercarriage 22 is a dual drive d.c. electric motor 30 having a pair of drive sheaves 32, 34, each drive sheave being fixed on a shaft extending from the motor. Although the electric motor may be of any desired horsepower rating depending on the total power requirements of the cart, the present feed cart which has a 30 bushel capacity utilizes a 1.6 horsepower motor. The motor 30 functions to drive the feeding components of the feed cart 20 and also serves as a source of motive power for moving the vehicle.

First, with respect to providing motive power to the feed cart vehicle, it will be noted from FIG. 3 that the innermost drive sheave 32 of the motor 30 is drivingly interconnected to a transmission input drive sheave 38 by a belt 40, the input drive sheave 38 being operative to drive a two speed, forward-reverse transmission 36. Transmission 36 includes a pair of actuating or control arms 36a, 36b, each arm being adapted to change either the speed (high or low) or direction (forward or reverse) of the transmission. Details of the inner transmission structure are not shown as they are clearly not material to the present invention. However, should a detail understanding of such a transmission be desired, one is referred to a model 36 transmission manufactured by J. B. Foote Foundry Company of Fredericktown, Ohio.

Continuing to refer to FIG. 3, it will be noted that a clutching sheave 35 is carried by a pivotally mounted bracket 37, the clutching sheave 35 being aligned with the belt 40 for selective engagement therewith for clutching and declutching of the final drive. To actuate the bracket 37 and consequently the clutching sheave 35, a hand lever 39 (FIG. 1) is pivotally mounted to the rear of the feed cart and operatively connected to said bracket 37 by a pair of links, 41a, 41b, interconnected by a bell crank 41c. In essence, the present clutch design is quite conventional inasmuch as the hand lever 39 simply actuates said clutching sheave back and forth to tension and slacken belt 40.

Driving torque is transmitted from transmission 36 via an output drive sprocket 42 which is drivingly interconnected by a first chain 60 to a first reduction sprocket 44 fixed on an adjustable jack shaft 48. A further speed reduction is realized by a second reduction sprocket 46 also fixed on said adjustable jack shaft 48 and drivingly interconnected to a conventional wheel differential 64 by a second chain 62, the wheel differential being operative to drive the front wheels 24.

As noted above, jack shaft 48 is particularly designed to be adjustable for simultaneously adjusting the tension of each of the chains 60, 62. With reference to FIGS. 6 and 7, it will be observed that shaft 48 is rotatively mounted within a pair of axially spaced bearings 49, each bearing 49 being welded, or secured by other suitable means, to an L-shaped mounting bracket 56. The L-shaped brackets 56 are disposed about the outer sides of a pair of laterally spaced inner support plates 50 formed within said undercarriage 22. Cut outs 51 are formed within each inner support plate 50 to accommodate the jack shaft 48. Each bracket 56 is maintained adjacent a respective inner support plate 50 by a pair of side bolt assemblies 54, each bolt assembly extending through a generally fore-and-aft elongated slot within the particular L-shaped bracket 56 and a generally vertical elongated slot formed within the adjacent inner plate, as best seen in FIG. 7. The brackets 56 are interconnected about their inwardly directed ends by an end plate 53 having a draw bolt 55 threaded therein and generally abutting against a cross support 52 fixed between the inner plates 50. Thus, it is seen that by moving the L-shaped brackets 56 relative to the inner support plates 50, results in the tension of chains 60, 62 being adjusted. Thus, to adjust the tension in chains 60, 62, the side bolt assemblies 54 are loosened which enables the L-shaped brackets to be moved either fore-and-aft or vertically due to the elongated slots in the inner plates 50 and L-shaped brackets 56. Movement in both directions, fore-and-aft and vertical, is deemed necessary because the two chains 60, 62 are disposed in different planes (FIG. 2) and in the present application are not necessarily of equal lengths. Therefore, in practice, after the side bolt assemblies 54 have been loosened, the draw bolt 55 may be turned against cross support 52, thus moving brackets 56 in the fore-and-aft direction.

In the present embodiment, movement of the brackets 56 in the fore-and-aft direction is effective to adjust chain 60. Once the proper tension is reached on chain 60, the brackets 56 may be moved vertically to adjust the tension in the second chain 62 without significantly effecting the tension already set with respect to chain 60. It should be pointed out that the brackets 56 are particularly disposed such that the plane thereof lies generally between the planes of the two chain drives 60, 62, as best seen in FIG. 2. However, the brackets 56 are slightly more aligned with chain 62 interconnecting sprocket 44 with the wheel differential 64 in order that the maximum shock loads encountered by the final reduction will be more fully absorbed by the brackets 56.

FIGS. 9–14 illustrate a control linkage system for the two speed, forward-reverse transmission 36. Specifically, the control linkage system comprises a control lever 66 pivotally mounted about the rear of the feed cart 20 (FIG. 1) and generally disposed within a shroud 80 and shiftable therein within the confines of an H-shaped shifting quadrant, not shown. The lower portion of the control lever 66 is fixed to an intermediate actuating tab 68 having a longitudinal slot 70 formed therein. Intermediate actuating tab 68 is connected directly to transmission actuating arm 36a by a connecting link 76. (It should be noted that in the present design actuating arm 36a is operative to shift between forward and reverse.) Pivotally mounted about the rear of the feed cart generally below the upper portion of control lever 66 is a bell crank 72, the bell crank being pivotally mounted about axis 73. The bell crank 72 is generally disposed in a plane just above the intermediate actuating tab 68 and is operatively connected thereto by a stud 74 that extends from the bell crank and is confined within the longitudinal slot 70. Bell crank 72 is operatively connected to the forward-reverse transmission actuating arm 36b by a connecting link 78 that extends in general parallel relationship relative to the aforementioned connecting link 76. Thus, as viewed in FIGS. 11–14, lateral movement of the control lever 66, and consequently the intermediate actuating tab 68, is effective to pivot the bell crank 72 either clockwise or counterclockwise about pivot point 73. Movement of the intermediate actuating tab 68 to the left results in the bell crank 72 being pivoted clockwise and the transmission actuating arm 36b being pulled to the forward position, as shown in FIGS. 11 and 13. Movement of the intermediate actuating tab 68 to the right results in the bell crank 72 being pivoted counterclockwise and causing the transmission actuating arm 36b to be shifted to the reverse position. It will be noted that the lateral back-and-forth movement of the intermediate actuating tab 68 is not effective to shift the other transmission actuating arm 36a because the distance between the arm 36a and the actuating tab 68 is relatively unchanged.

Once a selection of direction has been made, then the speed is selected by moving the control lever 66 in either a fore or aft direction relative to the feed cart. Referring again to FIGS. 11–14, it will be observed that the forward movement of the actuating tab 68 results in the transmission speed arm 36a being shifted to the low speed position, as shown in FIGS. 11 and 12. In similar manner, the movement of the actuating tab 68 rearwardly results in the transmission speed actuating arm 36a being shifted to a high speed position (FIGS. 13 and 14). It will be observed that the fore and aft movement of the actuating tab 68 does not effect the forward-reverse directional setting already made because the longitudinal slot 70 formed within tab 68 allows actuating tab 68 to move fore-and-aft without effecting the bell crank 72. Thus, it is seen that the present control linkage system for the two speed forward-reverse transmission allows the operator to select either of the following four gear selections: (1) forward low speed, as shown in FIG. 11 (F-L), (2) forward high speed, as shown in FIG. 13 (F-H), (3) reverse low speed, as shown in FIG. 12 (R-L), and (4) reverse high speed, as shown in FIG. 14 (R-H). Therefore, it will be appreciated that the present control linkage system for the two speed, forward-reverse transmission allows the operator to shift easily and conveniently between forward and reverse directions, and further provides means for shifting between low and high speeds for either directional choices made. Also, it is apparent that in shifting between forward and reverse the control linkage must pass through a completely neutral position. Specifically, the control lever 66 must pass through the transverse section of the H-shaped shifting quadrant in order to shift between forward and reverse, while movement in the longitudinal sections of the quadrant simply results in a speed change. This is quite advantageous in such a mobile cart as presently disclosed between it has the practical effect of preventing the operator from shifting between forward and reverse while proceeding at an appreciable speed and thereby preventing in some instances damage to the entire transmission structure.

Referring back to FIG. 1 and continuing to make reference to the general feed cart 20, a hopper or feed box is generally indicated by the numeral 82 and is disposed squarely above the undercarriage structure 22. Referring to the hopper or feed box 82 in detail it will be observed that the hopper or feed box comprises a pair of laterally spaced generally upright side walls 84 and the side walls are joined at opposite ends of the feed cart by respective end walls, not particularly shown in the drawings. Thus, the hopper or feed box 82 generally comprises a rectangular type container structure for containing various feed stuffs to be distributed within the livestock feeding area. The feed box 82 further includes a double floor arrangement 86, 88, and a chain slat type conveyor, indicated generally by the numeral 90, the chain slat conveyor being generally disposed about the upper floor 86 and having a lower segment thereof always disposed between the two floors 86, 88. The present slat chain conveyor is provided with a tension adjusting mechanism 92, as shown in FIG. 1, which allows the operator to selectively adjust the tension of the chain that carries the various slats across the upper floor 86. Also, the tension adjusting mechanism 92 is spring loaded to continuously maintain an adjusting force on the chain to compensate for wear and the possible presence of material between the chain and any of the chain sprockets. As will become apparent from the subsequent description of the present feed cart, the chain slat conveyor 90, sometimes referred to as an apron conveyor, is utilized to carry the feed material towards the front of the feed cart where the material is fed out by a series of augers into the livestock feeding area.

As shown in dotted lines in FIG. 1, the forward portion of the feed box 82 includes a series of generally vertically spaced and aligned augers, these augers being referred to from the bottom up as augers 94, 96, 98, 100. Each of the augers just referred to is supported by a shaft, the shafts of the respective augers being denoted from the bottom up by numerals 95, 97, 99, 101.

Although the particular structure of the augers are not shown in detail, it should be pointed out that the lower augers 94, 96, extends transversely across the lower forward portion of the feed cart 20 and are particularly operative to auger material from the feed box 82 out a port formed on the side of the feed box opposite the side shown in FIG. 1. The remaining two augers 98, 100, disposed above the lower augers 94, 96, are provided with reversed split flighting that is effective to pull and convey the material inwardly therefrom, with the particular auger flightings of the upper augers being staggered to avoid overloading in one single area.

Continuing to refer to FIG. 1 and particularly to the drive system for driving the vertically spaced augers, it is seen that a feeder start control handle 102 is stationed about the rear of the feed cart 20 and operatively connected to an idler arm 107 by a connecting link 104. The idler arm 107 includes a rotatively mounted idler 106 that is particularly aligned for engagement with a drive belt 108 trained around the outermost drive sheave 34 of the electric motor 30 and further trained around a large diameter sheave 110 that is fixed to shaft 97. The idler arm 107 is biased by a spring 107 disposed about the forward portion of connecting link 104. Shaft 97 includes a drive sprocket 112 fixed thereto and disposed inwardly of the large sheave 110. Drive sprocket 112 is operative to drive the lowermost auger 94 and the shaft thereof 95 by a chain drive which includes a chain 118 trained around the drive sprocket 112 and a pair of idlers 114 and further trained around a lower auger drive sprocket 116. Thus, it is seen that by the actuation of the feeder start handle 102 the two lowermost augers 94, 96 are driven such that the two augers feed material out the port formed in the one side of the hopper or feed box 82.

Also, shaft 97 further includes a coaxial drive sheave (not particularly shown) that is disposed inwardly of the larger diameter sheave 110 and is operative to drive another sheave 122 which is fixed to and rotatable with shaft 99, driving torque being applied to sheave 122 by a secondary drive belt 120. Driving torque is again transferred from shaft 99 to shaft 101 by a chain 128, the chain 128 being trained around an inner drive sprocket 124 fixed to shaft 99 and a larger drive sprocket 126 fixed to the uppermost shaft 101. Moreover, chain sprocket 126 is utilized to drive a ratchet wheel 130 which is secured to shaft 132, shaft 132 being operative to drive the chain slat conveyor indicated generally by the numeral 90. In particular, a connecting rod 134 is pivotally connected to the chain sprocket 126 at one end and includes a pair of arms 136 (only one of which is shown) pivotally connected at the other end. The arms 136 have one end pivotally mounted coaxially to the shaft 132. Also, arms 136 includes a spring biased dog 138 that is operatively engaged with the teeth of the ratchet wheel 130. Thus, as the chain sprocket 126 is rotated, the dog 138 moves back and forth across the teeth of the ratchet wheel 130. It will be seen from FIG. 1 that on the fore stroke the dog engages the teeth and causes the wheel to rotate a certain degree, driving the slat conveyor 90 in the process. On the other hand, during the aft stroke, the dog 138 is spring biased to ratchet past the teeth of the wheel 130.

To start the upper two augers 98, 100 and all of the other drive elements driven thereby, a secondary feeder control handle 140, which is also disposed about the rear of the feed cart must be actuated. Secondary control handle 140 basically performs the two following operations: (1) it serves to actuate a clutch mechanism 146 for clutching and declutching the drive extending from shaft 97 to shaft 99, and (2) it further serves to actuate a cam plate 162 which partially covers a selected segment of teeth on the ratchet wheel 130, thereby providing a control for the rate of speed of the slat conveyor 90.

First, with respect to the cam plate 162, it will be observed that this plate is rotatively mounted about shaft 132 and by moving control handle 140 upwardly in increments the cam plate 162 is adapted to respond to move counterclockwise around the ratchet wheel 130, thereby progressively exposing more teeth of the ratchet wheel for engagement with dog 138 and consequently increasing the speed of the slat conveyor in the process.

Referring now to the clutch mechanism 146 which is controlled by secondary feeder control handle 140, it will be observed that this clutch mechanism includes an idler 148 aligned for engagement with secondary drive belt 120, the idler being rotatively mounted on an arm 150 that is pivotally mounted to a side 84 of the feed cart. A spring 154 is connected to the upper end of arm 150 and is normally operative to bias idler 148 for engagement with belt 120. The arm 150 includes a tab 151 fixed to an intermediate portion thereof and having an aperture formed therein for receiving the forward end of the connecting link 142. Although not shown, the forward portion of the connecting link 142 includes a stop that normally engages the tab 151 and maintains idler 148 in its rearmost position which maintains the secondary belt 120 in a non tension position. Thus, by actuating the control lever 140, the connecting link 142 is moved forwardly, allowing the spring 154 to bias idler 148 into engagement with belt 120, thereby causing driving torque to be transferred from shaft 97 to shaft 99. Also, connecting link 142 is operative to gradually move a hinged baffle structure 156 from a generally horizontal position to a vertical position adjacent the front end wall as the control handle 140 is progressively moved upwardly. It will be observed from FIG. 1 that the hinged baffle structure 156 includes a connecting arm 158 that is engaged with a stop 160 secured to the connecting link 142. Therefore, as the feed material is emptied from the feed cart and the speed of the slat conveyor is progressively increased, the baffle structure is lowered progressively in the process, allowing the feed material disposed thereabove to more easily drift downward into the lower forward portion of the feed cart where it may be readily conveyed from the feed cart. One of the principal reasons for the baffle structure 156 is to generally restrict the downward flow of material from the upper forward portion of the cart when the hopper or feed box 82 is in a full loaded condition. Thus it is seen that the secondary feeder control handle 140 is operative to control the speed of the slat conveyor 90, the clutch mechanism 146 for the upper two augers, and the hinge baffle structure 156.

Turning to FIG. 4, a battery drawer is shown therein and indicated generally by the numeral 164. The battery drawer 164 comprised a generally flat bottom 166 with side edges 167 extending upwardly from opposite sides thereof. The bottom plate 166 also has two end channel members 168 secured at opposite ends thereof and a center channel member 170 secured generally between the end members 168. Disposed on opposite ends of the battery drawer 164 are generally upright end plates 172, the end plates being particularly adapted to assume a coplanar relationship with the sides 23, 25 of the undercarriage structure when the battery drawer is completely confined within the undercarriage structure 22. Transversely spaced along each side of the edge 167 is a series of rotatively mounted rollers 174. The battery drawer 164 is adapted to be received within the opening 27 formed in each of the side walls 23, 25 of the undercarriage structure, and the rollers 174 are particularly adapted to be confined within guide rails 173 that are an integral part of the undercarriage structure 22 and extend transversely thereacross in lateral spaced apart relationship. On either side of the battery drawer 164, is provided a locking pin 176 that extends up through one of the end channel members 168 and is turned outwardly to project through a respective end plate 172 for convenient operator access. The locking pin 176 is spring biased by a spring 178 that is confined around a portion thereof within the channel structure, the spring 178 being specifically confined between a washer 180 fixed to the pin 176 and the upper portion of the end channel member 168. The bottom portion of the locking pin 176 is tapered to facilitate insertion thereof into an aperture formed at a predetermined location within the undercarriage structure 22, as best seen in FIG. 5. Furthermore, the battery drawer 164 is provided on one side with a stop 175, as shown in FIG. 4, the stop being particularly spaced to engage either side wall 23, 25 of the undercarriage structure when the battery drawer is extended from either side of the cart.

The battery drawer 164 of the present embodiment is adapted to contain four six volt batteries with two batteries being disposed on each side of the central channel member 170 as illustrated in FIG. 3. It is observed that a central rod 182 projects upwardly from the central channel member and includes a holding bracket 184 (FIG. 3) which may be securely tightened down on the batteries 186, thereby stabilizing the batteries and preventing them from shifting around within the drawer.

Therefore, it is seen that to gain access to the batteries 186 for repair or service the operator simply pulls the locking pin 176 up and slides the battery drawer 164 from a selected side of the cart. Because of the presence of stop 175 the drawer will only extend approximately half way out from the cart such that only the two batteries on that particular side may be reached. To gain access to the other two batteries, it follows that the drawer must be extended from the other side of the cart. This is quite advantageous because of the substantial mass associated with the batteries is prevented from being disposed a substantial distance outwardly of the cart which, because of a lever arm effect, could possibly cause the entire cart to tip over. Also, again because of the great mass associated with the batteries, the central location of the battery drawer and the batteries contained therein give the present feed cart 20 a very favorable center of gravity which allows the feed cart to be freely maneuvered around the livestock feeding area without significant danger of tipping over.

Turning to FIG. 8, a brief reference should be made to the power system of the present feed cart 20. It will be noted that the four batteries 186 are connected in series to yield 24 volts and that the electric motor 30 is actuated by a solenoid 190 through a conventional switch 188. Although not shown, the present electrical system may preferably include a recharging receptacle that allows the batteries to be charged from an appropriate recharging unit.

The terms, "upper" "lower," "forward" "rearward" etc. have been used herein merely for the convenience of the foregoing specification and in the appended claims to describe the battery powered feed cart and its parts as oriented in the drawings. It is to be understood, however, that these terms are in no way limiting to the invention since the battery powered feed cart may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A battery powered feed cart having a relatively long, high and narrow body profile comprising in combination: an undercarriage chassis structure having a pair of spaced apart side walls; wheel means mounted underneath said undercarriage chassis structure; a feed box disposed above said undercarriage chassis structure; means mounted within said feed box for distributing feed therefrom; an electric motor mounted to said undercarriage structure; auger drive means interconnected between said electric motor and said auger drive means for driving an auger means; wheel drive means interconnecting said electric motor with said wheel means for driving said wheel means; a battery drawer transversely disposed and slideably mounted generally midway between the side walls of said undercarriage structure having a relatively low and central location within said feed cart and being slidable outwardly from either side of said undercarriage structure; and battery means disposed within said battery drawer and operatively connected to said electric motor for powering said electric motor.

2. A battery powered feed cart, as recited in claim 1, wherein said battery drawer extends substantially the width of said undercarriage structure and includes a pair of laterally spaced upright end plates which are generally co-planar with said side walls of said undercarriage structure when said battery drawer is wholly contained within said undercarriage structure.

3. A battery powered feed cart, as recited in claim 2, wherein said battery drawer includes a flat bottom plate extending between said end plates and wherein said drawer includes a plurality of rollers disposed on each side thereof with said rollers being engageable with a pair of guide rails disposed transversely within said undercarriage structure.

4. A battery powered feed cart, as recited in claim 3, wherein said battery drawer includes a spring biased locking pin, and wherein said locking pin is particularly adapted to be received be a receiving aperture formed within said undercarriage structure, such that said drawer is normally held stationary relative to said undercarriage structure, and wherein the removal of said locking pin from said receiving aperture enables said drawer to be pulled outwardly from either side of said undercarriage.

5. A battery powered feed cart, as recited in claim 1, wherein said wheel drive means includes a two speed, forward-reverse transmission having a speed control arm and a directional control arm extending therefrom, and a transmission control linkage operatively connected to said two speed, forward-reverse transmission for actuating the same, said transmission control linkage comprising: a control lever moveably mounted adjacent said feed cart and adapted to move both laterally and fore-and-aft, an intermediate actuating tab fixed to said control lever and operatively connected to one of said control arms extending from said transmission for actuating said one arm in response to the fore-and-aft movement of said control lever; a bell crank pivotally mounted adjacent said intermediate actuating tab and operatively connected to said other control arm extending from said two speed, forward-reverse transmission, said bell crank having a stud fixed thereto and confined within an elongated fore-and-aft extending slot formed within said actuating tab, whereby fore-and-aft movement of said control lever is relatively ineffectual relative to said bell crank, and wherein lateral movement of said control levdr operates to pivot said bell crank and thereby actuate said other arm extending from said two speed, forward-reverse transmission.

6. A battery powered feed cart, as recited in claim 5, wherein said transmission control linkage includes a pair of generally parallel extending connecting rods, one rod interconnected between one transmission control arm and said bell crank, and the other connecting rod interconnected between the other transmission control arm and said actuating tab, said other connecting rod being particularly arranged relative to the total transmission control linkage such that lateral movement of said control lever is relatively ineffectual to actuate said other connecting rod and the transmission arm connected thereto since said last mentioned rod tends to swing in an arc in response to such lateral movement.

7. A battery powered feed cart, as recited in claim 1, wherein said wheel drive means interconnecting said electric motor with said wheel means comprises: a transmission drivingly interconnected to said electric motor; an adjustable jack shaft having a first chain sprocket fixed thereto and drivingly interconnected with said transmission by a first chain, said adjustable shaft having a second chain sprocket drivingly interconnected with a wheel differential by a second chain; and an adjustably mounted structure having said shaft rotatively mounted therein and particularly adapted to move said adjustable shaft generally vertically and fore-and-aft relative to said transmission and wheel differential for adjusting the tension in said first and second chains.

8. A battery powered feed cart, as recited in claim 7, wherein said adjustable mounting structure includes a pair of laterally spaced brackets having said adjustable shaft rotatively mounted therein, said brackets being adjustably mounted for both vertical and fore-and-aft movement to an inner support structure extending from said undercarriage structure.

9. A battery powered feed cart, as recited in claim 8, wherein said inner support structure and said brackets are provided with corresponding vertical and fore-and-aft slots and bolt assemblies secured within said slots.

10. A battery powered feed cart, as recited in claim 9, wherein said brackets include a draw bolt assembly for fore-and-aft adjusting of said shaft.

* * * * *